(No Model.) 3 Sheets—Sheet 1.
E. W. STRAIN.
PROCESS OF REFINING, REDUCING, AND SEPARATING HYDROCARBON OILS.
No. 311,543. Patented Feb. 3, 1885.
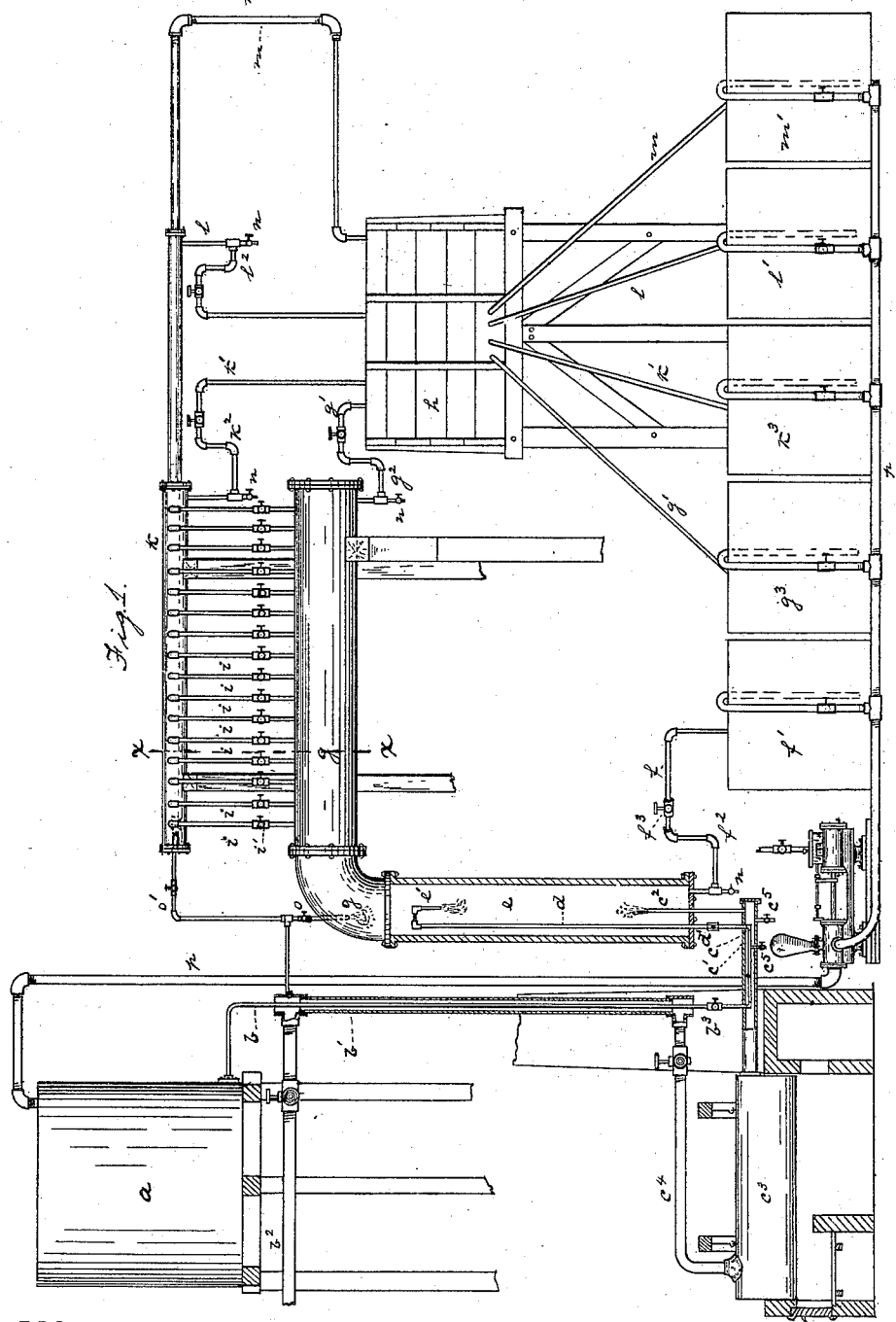
Witnesses
Jno. K. Smith
R. C. Golden
Inventor
Ebenezer W. Strain
by his attorneys
Bakewell & Kerr (No Model.) 3 Sheets—Sheet 2.
E. W. STRAIN.
PROCESS OF REFINING, REDUCING, AND SEPARATING HYDROCARBON OILS.
No. 311,543. Patented Feb. 3, 1885.
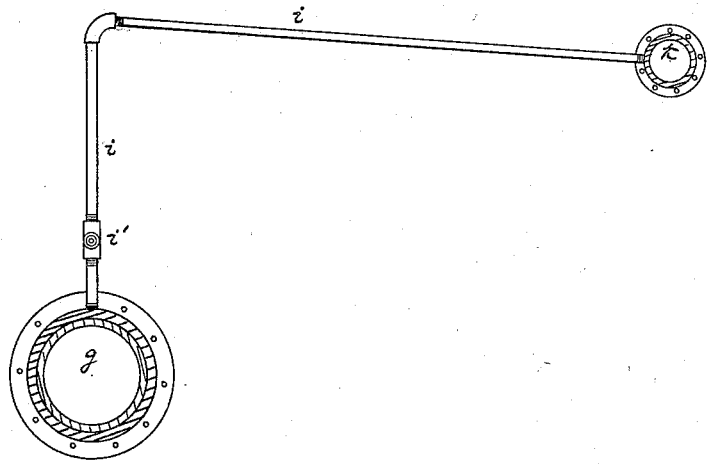
Witnesses
Jno K. Smith
R. C. Golden
Inventor
Ebenezer W. Strain
by his attorneys
Bakewell & Kerr (No Model.) 3 Sheets—Sheet 3.
E. W. STRAIN.
PROCESS OF REFINING, REDUCING, AND SEPARATING HYDROCARBON OILS.
No. 311,543. Patented Feb. 3, 1885.
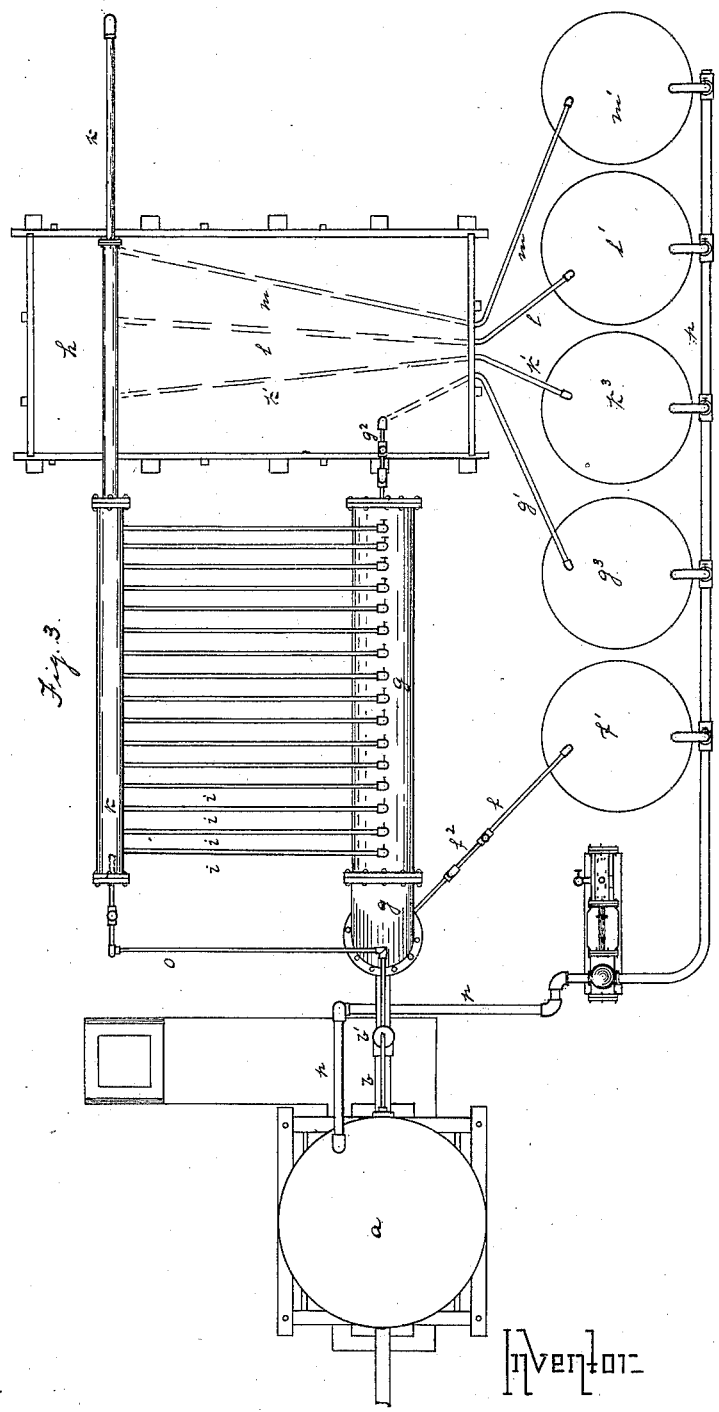

UNITED STATES PATENT OFFICE.

EBENEZER W. STRAIN, OF ALLEGHENY CITY, ASSIGNOR TO HIMSELF, AND ROBERT P. CRAWFORD, OF LOWER BURRELL TOWNSHIP, WESTMORELAND COUNTY, PENNSYLVANIA.

PROCESS OF REFINING, REDUCING, AND SEPARATING HYDROCARBON OILS.

SPECIFICATION forming part of Letters Patent No. 311,543, dated February 3, 1885.

Application filed October 18, 1883. (No model.)

*To all whom it may concern:*

Be it known that I, EBENEZER W. STRAIN, of Allegheny City, in the county of Allegheny and State of Pennsylvania, have invented a new and useful Improvement in Refining, Reducing, and Separating Hydrocarbon Oils; and I do hereby declare the following to be a full, clear, and exact description thereof.

My invention relates to an improved method of refining, reducing, and separating petroleum and hydrocarbon oils, and it has for its object the separation of the oils which vaporize at different degrees of temperature from each other, and the elimination of the fixed gases, without injury to or the discoloration of the oil; and it consists in reducing the petroleum or hydrocarbon oil, while in a state of transit under pressure, by a non-destructive distillation, and, after permitting the expansion of the vapors, in trapping the reduced oil and the distillates at or before the points of condensation of such distillates in their transit or passage, so that the reduced oil is removed from the influence of the reducing heat as soon as the reduction is effected. By the term "non-destructive distillation" is meant a distillation which does not result in the production of a tarry or carbonaceous residuum.

I will now describe my invention so that others skilled in the art may apply the same, reference being had to the accompanying drawings, forming part of this specification, in which—

Figure 1 is a side elevation of my improved apparatus, partially in section. Fig. 2 is a section through the cylinder G and K, on the line $x\ x$, Fig. 1; and Fig. 3 is a plan view of the apparatus.

Like letters of reference indicate like parts.

In the form of apparatus employed by me, as shown in the drawings, $a$ represents an elevated supply-tank leading downward, from the bottom of which is a pipe, $b$, surrounded by a steam-jacket, $b'$, to and in communication with a horizontal pipe, $c$, surrounded by a steam-jacket, $c'$, which pipe leads to and communicates with a pipe, $d$, extending vertically upward into a reducer, $e$, and at the upper portion of the reducer is connected with a sprayer, $e'$, arranged to spray the oil downward in and from the upper portion of the reducer. This reducer $e$ is cylindrical in form and arranged vertically, and opening through the lower end thereof is a steam spray or jet pipe, $c^2$, which communicates with the steam-jacket $c'$. Live steam is supplied to the jacket $b'$ by a pipe, $b^2$, which leads from a boiler or other suitable steam-generator, and superheated steam is supplied to the jacket $c'$ from the superheater $c^3$, which superheater is connected with the steam-pipe $b^2$ by a pipe, $c^4$. These pipes $b$ and $d$ are provided with stop-cocks $b^3\ d'$, by means of which the supply of oil to the reducer $e$ is regulated. Stop-cocks are also arranged in the pipes $b^2$ and $c^4$ to regulate the flow of steam to the steam-jackets. Gages $c^5$ are placed on the steam-pipe $c^2$, the purpose of which is to enable the temperature of the steam or oil to be tested at these points by a thermometer.

Leading from the bottom of the reducer $e$ is a pipe, $f$, which extends to and opens into a tank or receiver, $f'$. Between the reducer and the tank the pipe $f$ is bent so as to form the trap $f^2$, and in the pipe is a stop-cock, $f^3$.

Leading from the top of the reducer $e$ is a cylindrical pipe, $g$, extending nearly horizontally from the reducer, and the outer end of which is slightly below the level of the end which opens into the reducer. A pipe, $g'$, which opens into the outer end of the pipe $g$ at the bottom thereof, and is bent so as to form the trap $g^2$, extends thence through the condenser or cooler into a tank or receiver, $g^3$.

Extending vertically upward from and along the top of the horizontal pipe $g$ are pipes $i$, each of which is arranged at a certain distance from the other, and is provided with a stop-cock, $i'$. These pipes are numerous, and a greater or less number of them may be put in connection with the pipe $g$, as may be desired. These pipes $i$ extend vertically upward a distance of about four feet, and thence, nearly horizontally, slightly downward to a horizontal pipe, $k$.

Leading from the pipe $k$, at a point beyond the pipes $i$, is a pipe, $k'$, bent so as to form a trap, $k^2$, and extending thence through the cooler or condenser $h$ to a tank or receptacle, $k^3$. A second and similar pipe, $l$, at a point farther along the pipe $k$, extends thence through the cooler or condenser $h$ to a tank or receiver, $l'$, and is bent so as to form a trap, $l^2$.

Communicating with the outer end of the pipe $k$ is a pipe, $m$, which extends through the condenser $h$ into a tank or receptacle, $m'$. Each of the traps $f^2\ g^2\ h^2\ l^2$ is provided with a stop-cock, $n$, the purpose of which is to clean out the traps.

Opening into the end of the pipes $g$ and $k$, nearer the reducer $e$, is a steam-pipe, $o$, by means of which steam is introduced into the pipes. The pipes $g\ i\ k$ form an air-condenser interposed between the reducing-chambers $e$, where the vapors and gases expand, and the usual worms or water-condensers, $h$, where they are finally condensed, so that the vapors have a chance to separate by gravity in gradually-decreasing temperatures.

The oil, either crude petroleum or a distillate thereof, to be reduced, refined, and separated is fed into the tank $a$, from which it descends through the pipe $b$, where it is heated by the steam in the jacket $b'$, into the pipe $e$, where it is still further heated by the superheated steam in the jacket $c'$, through the pipe $d$, and is sprayed downward from the sprayer $e'$ into the reducer $e$, where it first expands, permitting a separation of the vapors according to gravity, and then comes in contact with the jets or spray of superheated steam rising from the steam pipes or sprayer $c^2$. The oil having been raised to a degree of temperature by the steam in the jacket sufficient to volatilize the lighter oils, and being further heated by the spray of steam in the reducer, the volatilized portion passes off from the top of the reducer, while the heavier and reduced oil, or that which separates by gravity, falls to the bottom and thence passes through the pipe $f$ and trap $f^2$ into the tank or receiver $f'$. The vaporized oil passes up through the reducer into the horizontal cylindrical pipe $g$, being retarded, if desired, by a jet of live steam from the pipe $o$. Whatever of the vaporized oil is here condensed flows along the pipe $g$ to the outlet-pipe $g'$, through the pipe and trap $g^2$ into the tank or receiver $g^3$. As the pipe $g'$ passes through the cooler $h$ the vapors are all condensed and cooled before entering the tank. The lighter vapors rising through the pipes $i$, owing to the draft caused by the steam-pipe $o'$, enter the horizontal pipe $k$ and flow along the same, being trapped as they condense by the pipes $k'$ and $i$, and passing into the tanks $k^2$ and $l'$. The lighter vapors, together with the steam, pass through the pipes $k$ and $m$, through the condenser $h$ into the tank $m'$. By this operation the oil is first heated under pressure as it descends to the reducer. The lighter products are volatilized in the reducer and pass off into the separator, where, being gradually condensed, they are separated during their passage, and are conducted into separate tanks or receivers, while the heavier or reduced oil, or that which separates by gravity alone, is conducted from the reducer as soon as the reduction or separation of the lighter oils is effected.

In order to prevent the rapid condensation of the vapors in the pipes $g$, it is preferably covered with felt or other non-conductor of heat.

By means of the stop-cocks $i'$ the passage of the vapors from the pipe $g$ may be regulated so as to determine the specific gravity of the oils discharged into the separate receiving-tanks, as where the passage is retarded a greater amount of oil will be trapped into the first receiving-tank.

During the passage of the oil through the traps in the pipes leading from the reducer and separator the paraffine, tar, and any deleterious matter becomes deposited therein, from which it is removed by blowing steam through the gage-cocks.

If desired, any one or all of the products of the foregoing operations may be subjected to a subsequent and repeated refining, reducing, and separating operation by pumping the oils from the receiving-tanks through the pipe $p$ into the tank $a$, by which a continuous redistillation is effected.

Although I have described a particular form of apparatus, I do not desire to limit myself thereto; nor do I desire to confine myself to the elevated tank for the purpose of supplying the oil to the reducer under pressure, as a pump may be substituted therefor.

The advantages of my invention are that the oil may be continuously separated into as many grades as is desired; the separation is complete; the oil is not injured or discolored by the operation; the absence of waste, and the rapidity and simplicity of the reduction and separation. At the same time the oil is refined, deodorized, and separated from paraffine, tar, and other deleterious matter without being discolored or injured by destructive distillation, and also, as the oil is heated while in a state of transit and is not allowed to remain under the action of the heat, distillation is effected without the production of tarry and carbonaceous residuums.

I am aware that the lighter gases have been separated from hydrocarbon oils by spraying heated oil in a chamber in the presence of steam; also, by spraying the oil in a reducing-chamber in the presence of steam, the vapor and steam being conducted from the reducing-chamber through a condenser by means of a vacuum-pump, while the heavier oils are conducted from the bottom of the reducer; also, that oil while percolating through a chamber has been subjected to the action of steam for a like purpose, and I do not desire to claim any of these processes, broadly.

I do not herein claim the apparatus described for carrying out my process, as the same forms the subject-matter of application, Serial No. 109,347, of even date herewith.

Having thus described my invention, what I claim, and desire to secure by Letters Patent, is—

1. The herein-described method of refining, reducing, and separating oil by a continuous process, consisting, first, in subjecting it to the action of heat under pressure and while in a state of transit, whereby it is raised to such a sufficient degree of temperature as to cause the separation of the volatile gases from the heavier oils on removal of the pressure; second, in spraying the heated oil in an expansion-chamber; and, third, in trapping the oil which is condensed in the expansion-chamber, and conveying the uncondensed vapors through surface-condensers, where the vapors of different degrees of gravity are, at the points of condensation, trapped, and thereby separated, substantially as and for the purposes described.

2. The herein-described method of reducing, refining, and separating hydrocarbon oils by a continuous process, consisting in, first, subjecting the oil in transit and under pressure to a heat which will vaporize the same; secondly, spraying the oil into an expansion-chamber in the presence of superheated steam, where the oil and vapors are separated; and, thirdly, conducting the vapors through a surface or air condenser where the vapors of different degrees of gravity are, at the points of condensation, trapped, and thereby separated, substantially as and for the purposes described.

In testimony whereof I have hereunto set my hand this 1st day of October, A. D. 1883.

EBENEZER W. STRAIN.

Witnesses:
W. B. CORWIN,
JAMES K. BAKEWELL.